(12) United States Patent
Huang et al.

(10) Patent No.: US 8,420,936 B2
(45) Date of Patent: Apr. 16, 2013

(54) CABLE HARNESS

(75) Inventors: Detian Huang, Hitachi (JP); Takanobu Watanabe, Hitachi (JP); Noriyuki Imai, Hitachi (JP); Hiroshi Komuro, Hitachi (JP)

(73) Assignee: Hitachi Cable Fine-Tech, Ltd., Ibaraki (JP)

( * ) Notice: Subject to any disclaimer, the term of this patent is extended or adjusted under 35 U.S.C. 154(b) by 241 days.

(21) Appl. No.: 12/815,531

(22) Filed: Jun. 15, 2010

(65) Prior Publication Data
US 2010/0319989 A1 Dec. 23, 2010

(30) Foreign Application Priority Data

Jun. 23, 2009 (JP) .................................. 2009-149015
May 7, 2010 (JP) .................................. 2010-106919

(51) Int. Cl.
*H02G 15/02* (2006.01)
(52) U.S. Cl.
USPC .................... 174/74 R; 174/117 F; 174/88 R; 174/88 S; 439/497

(58) Field of Classification Search ................ 174/72 A, 174/117 F, 74 R, 88 R, 88 S; 439/497
See application file for complete search history.

(56) References Cited

U.S. PATENT DOCUMENTS

| 5,091,604 | A | * | 2/1992 | Kirma .............................. 174/2 |
| 5,378,853 | A | * | 1/1995 | Clouet et al. .................... 174/36 |
| 7,098,404 | B2 | * | 8/2006 | Hirata et al. ................. 174/72 A |
| 7,135,655 | B2 | * | 11/2006 | Tomiyasu et al. .......... 219/137.9 |

FOREIGN PATENT DOCUMENTS

JP 2006-024372 1/2006

* cited by examiner

*Primary Examiner* — Dhirubhai R Patel
(74) *Attorney, Agent, or Firm* — Scully, Scott, Murphy & Presser, P.C.

(57) ABSTRACT

A cable harness has a wire group made of plural electric wires, connector terminals provided at both ends of the wire group, a braid sleeve provided around an outer periphery of the wire group, and ground connecting parts provided at both ends of the braid sleeve that are configured to be electrically connected to a ground part in an equipment. The braid sleeve includes a metallized high tension fiber.

11 Claims, 10 Drawing Sheets

CABLE HARNESS

The present application is based on Japanese Patent Application Nos. 2009-149015 and 2010-106919 filed on Jun. 23, 2009 and May 7, 2010, respectively, the entire contents of which are incorporated herein by reference.

BACKGROUND OF THE INVENTION

1. Field of the Invention

The present invention relates to a cable harness to be used for an opening and closing part, a twisting part, or a U-shaped sliding part of equipment.

2. Prior Art

In recent years, in accordance with widespread of laptop computers, mobile phones, compact video cameras or the like, high-speed data transmission and high data density for these device are required in addition to the downsizing and down-weight of these devices. Further, in these devices, displays are configured to be openable and closable, twistable, or slidable. For that reason, a cable harness in which ultrafine coaxial cables are bundled together has been used as a harness between a main body and a display of the device.

The cable harness is wired while contacting a chassis in a narrow space between the display and the main body. Therefore, the middle of the harness is bundled and fixed by a tape made of PTFE (polytetrafluoroethylene) to prevent the coaxial cables from being pinched or abrasion.

FIG. 10 shows a conventional cable harness 121. In a middle part of the cable harness 121 (part except terminals), an electric wire 122 is wrapped and bundled by a tape 123 made of PTFE in order to prevent the electric wire 122 from being pinched or abrasion. A connector 124 is installed to both terminals of the electric wire 122. The connector 124 has plural poles, and plural wires 125 inside the electric wire 122 are connected to the poles of the connector 124, respectively. The terminals of the tape 123 are wrapped by an adhesive tape 126.

As to jacket material for an electric wire to be used for opening and closing part, twisting part, or U-shape sliding part (hereinafter referred to as "movable part") of the equipment such as mobile phones, fluorine resin has been mostly used. Herein, the "U-shape sliding" means a sliding operation along a U-shaped frame provided for connecting an upper casing and a lower casing configured to partially surround the upper casing, for example, an upper casing for mounting a liquid crystal display and a lower casing as a main body in a mobile phone. As to a binder tape material, PTFE which is a fluorine resin based material has been mostly used. However, the fluorine resin is apt to generate static electricity. Further, electromagnetic interference (EMI) between circuits may be caused by electromagnetic wave radiated from a signal line or an antenna in vicinity thereof. Therefore, it is necessary to suppress electrostatic noise caused by friction between the jackets of the electric wires or between the PTFE tapes at the movable part as well as the electromagnetic wave radiated from the signal line.

However, the entire cable harness bundled in one direction by the PTFE tape is lacking in flexibility and balance. Therefore, this type of the cable harness is apt to be oriented in a warping direction and to be repulsive, when the cable harness is installed in the equipment.

Further, movement of coaxial cables included in the cable harness is restricted by the PTFE tape, so that proper mechanical characteristics of the coaxial cables may be degraded easily.

Still further, the cable harness bundled by the PTFE tape is apt to be bent in a round shape. Therefore, it is difficult to install this type of the cable harness in a space of a casing with irregular configuration such as oval shape, rectangular shape, or triangular shape. If this type of the cable harness is forced to be installed in the space of the casing with the irregular configuration, the electric wire may be damaged by pressing.

Recently, the use of the cable harness in a slide-type mobile phone has been studied. However, operation of U-shape sliding cannot be performed smoothly, if the cable harness is bundled by the PTFE tape.

To solve these disadvantages, Japanese Patent Laid-Open No. 2006-24372 (JP-A 2006-24372) proposes following configuration. In a cable harness disclosed by JP-A 2006-24372, a braid sleeve is formed by using tinsel-copper, and a wire group is inserted through the braid sleeve. Then, the tinsel-copper may be connected to a ground potential part of an electric connector. The tinsel-copper may be connected to a ground terminal separately to be connected to a ground terminal in the equipment. The tinsel-copper may be connected to an outer conductor of a coaxial cable at a middle part of the wire group.

However, in the cable harness disclosed by JP-A 2006-24372, the tinsel-copper is so hard that the wire group should be inserted into a sleeve after being protected and bundled by an insulating tape, in order to prevent the copper foil from grazing and damaging a wire jacket due to direct contact between the wire group and the sleeve at a bending part. Such a configuration gives a factor of raising the production cost. Also, because the wire group is bundled by the insulating tape, the U-shape sliding cannot be performed smoothly, similarly to the cable harness bundled by the PTFE tape mentioned above. Also, the tinsel-copper is made by wrapping a copper foil tape on a high tension fiber. Therefore, the copper foil may be deteriorated or fall off on the substrate due to frequent flexion movement, thereby causing failure such as short-circuit.

SUMMARY OF THE INVENTION

Accordingly, an object of the present invention is to provide a cable harness which is to be used for a movable part of equipment and is excellent in electrostatic noise resistance, mechanical characteristics, and wiring operation.

According to a feature of the invention, a cable harness comprises:

a wire group comprising plural electric wires;

connector terminals provided at both ends of the wire group;

a braid sleeve provided around an outer periphery of the wire group, the braid sleeve comprising a metallized high tension fiber; and ground connecting parts provided at both ends of the braid sleeve that are configured to be electrically connected to a ground part in an equipment.

The braid sleeve may further comprise a high tension PET fiber.

The metallized high tension fiber and the high tension PET fiber may be alternately braided in the braid sleeve.

The high tension PET fiber preferably has a tensile strength of 700 MPa or more.

The braid sleeve may be braided such that a first thread and a second thread cross each other, in which the first thread comprises the metallized high tension fiber and the second thread comprises the high tension PET fiber.

The braid sleeve may be braided such that a first thread and a second thread cross each other, in which the first thread comprises a combination of the metallized high tension fiber and the high tension PET fiber and the second thread comprises the high tension PET fiber.

The metallized high tension fiber and the high tension PET fiber may be alternately disposed in parallel in the first thread.

The high tension PET fiber may comprise a single fiber, and the metallized high tension fiber may comprise a multi-strand fiber.

The ground connecting parts may be configured to be electrically connected to a ground part of an equipment comprising any of an opening and closing part, a twisting part, or a U-shape sliding part.

The wire group may be divided into two or more groups and provided with the braid sleeve, respectively.

The braid sleeve may be divided into two or more groups.

The metallized high tension fiber may comprise a copper-plated PET fiber.

The high tension PET fiber may comprise a non-metallized PET fiber.

Each of the ground connecting parts may comprise an extension of the metallized high tension fiber.

ADVANTAGES OF THE INVENTION

The cable harness according to the present invention is excellent in the electrostatic noise resistance, the mechanical characteristic, and the wiring operation.

BRIEF DESCRIPTION OF DRAWINGS

Next, embodiments according to the invention will be explained in conjunction with appended drawings, wherein.

DETAILED DESCRIPTION OF THE PREFERRED EMBODIMENTS

Figure 1A:
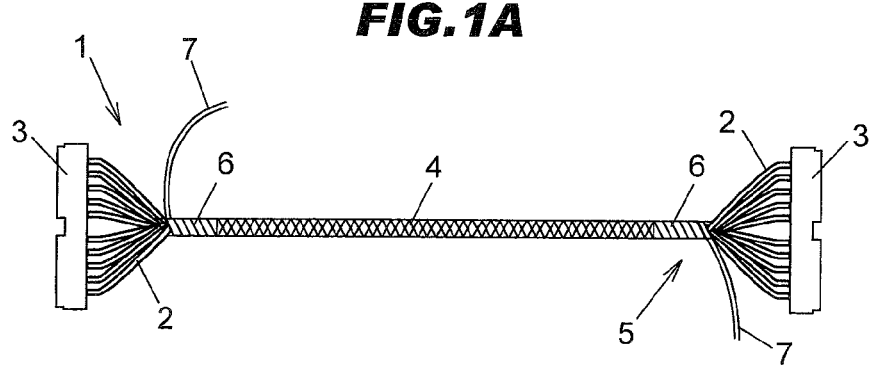
FIGS. 1A to 1D are side views of cable harnesses in first to fourth arrangements of a first embodiment according to the present invention.

Next, the embodiments according to the present invention will be explained in more detail in conjunction with the appended drawings.

First Embodiment

FIGS. 1A to 1D are cable harnesses 1 in the first to fourth arrangements in the first embodiment according to the present invention. For convenience, FIGS. 1A to 1D show side views of the cable harnesses 1, in which a vertical direction (upside and downside direction) corresponds to that for the cable harness 1, and a horizontal direction (right side and left side) corresponds to that for the cable harness 1. Obviously, the cable harness 1 may be used in a desired direction.

(Total Structure of Cable Harness 1)

Referring to FIGS. 1A to 1D, the cable harness 1 in the first embodiment comprises a wire group 2 comprising plural electric wires, connector terminals 3 provided at both ends of the wire group 2, respectively, a braid sleeve 4 provided around an outer periphery of the wire group 2, the braid sleeve 4 being formed by braiding metallized high tension fibers, more concretely, metal-plated high tension fibers, and ground connecting parts 5, in which both ends of the braid sleeve 4 and both ends of an outer conductor in the wire group 2 are electrically connected in parallel.

As for wires used for the wire group 2, an insulated wire, in which an inner conductor is insulated by a jacket (insulator), a four-conductor diagonal coaxial cable (so-called "Quad-X cable", "Quadrax cable", 'Quad cable", or the like) for LVDS (Low Voltage Differential Signaling), in which an outer conductor is insulated by a jacket (insulator), a single-conductor coaxial cable, in which an outer conductor is insulated by a jacket, a two-conductor parallel cable (so-called "Twinax cable"), or a twisted-pair cable may be used. A plurality of any one kind of the aforementioned wires and cables may be collectively used. Alternatively, a plurality of at least two or more kinds of the aforementioned wires may be used collectively. When using the wire group 2 composed of the insulated wires, only the both terminals of the braid sleeve 4 are electrically connected to the ground parts of the equipment.

As for metal-plated (metallized) high tension fiber composing the braid sleeve 4, high tension fiber comprising a PET (polyethylene terephthalate) fiber that is plated by aluminum, copper, or alloy thereof, a polyester fiber, or the like may be used. As for the high tension fiber, it is preferable to have a tensile strength of 700 MPa or more, similarly to high tension PET (polyethylene terephthalate) fiber described below. In the present embodiment, a copper-plated PET fiber comprising a PET fiber plated with copper is used as the metal-plated high tension fiber.

The braid sleeve 4 is wrapped by an adhesive tape 6 at the ends thereof and is fixed to the wire group 2, so as to prevent the braid sleeve 4 from raveling.

At each of the ground connecting parts 5, an extension 7 of the copper-plated PET fiber is provided. The extensions 7 are extended toward the right and left directions with respect to the end parts of the braid sleeve 4 wrapped by the adhesive tape 6 such that the ground connecting parts 5 can be easily connected electrically to a ground part of the equipment, which has an opening and closing part, a twisting part, or a U-shape sliding part (not shown).

(First Arrangement)

In the cable harness 1 shown in FIG. 1A, longitudinal sides of the connector terminals 3 provided at the both ends of the cable harness 1 are arranged vertically (the up and down direction) to an extended line of the wire group 2 (as a center), while the wire group 2 is arranged to extend horizontally (the right and left direction). In other words, the longitudinal sides of the respective connector terminals 3 are arranged vertically to the extended line of the wire group 2, and connecting portions (to be connected to the external device) of the connector terminals 3 are arranged toward opposite directions. Respective wires composing the wire group 2 are separated into a triangular shape (fan shape) from a distal end of the part wrapped by the adhesive tape 6 toward the connector terminal 3. Herein, the "distal end" is an end more distant than another end from a middle point of the wire group 2 in a longitudinal direction.

(Second Arrangement)

Figure 1B:
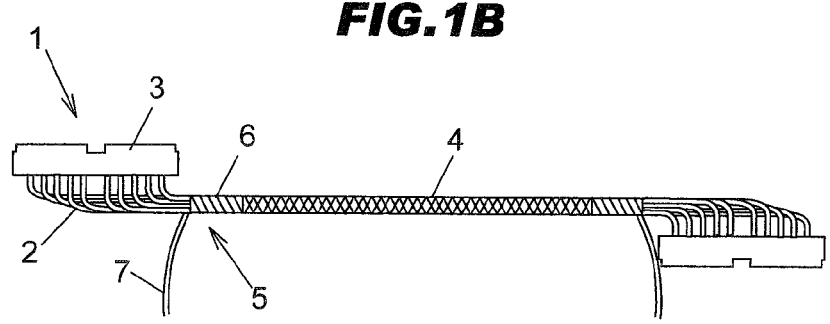

In the cable harness 1 shown in FIG. 1B, the longitudinal side of each of the connector terminals 3 provided at the both ends of the cable harness 1 is arranged horizontally, while the wire group 2 is extended horizontally. One of the connector terminals 3 is arranged above the extended line of the wire group 2 at the left end of the wire group 2, and the other of the connector terminals 3 is arranged below the extended line of the wire group 2 at the right end of the wire group 2. In other words, the longitudinal sides of the respective connector terminals 3 are arranged parallel to the extended line of the wire group 2, and the connecting portions of the connector terminals 3 are arranged toward opposite directions. Respective wires composing the wire group 2 are extended horizontally from the distal end of the part wrapped by the adhesive tape 6. The wires are separated at positions corresponding to respective connector pins in each of the connector terminals 3. The wires are bent toward the connector terminal 3, namely vertically to the extended line of the wire group, and extended straightly to the respective connector pins of each of the connector terminals 3.

(Third Arrangement)

Figure 1C:
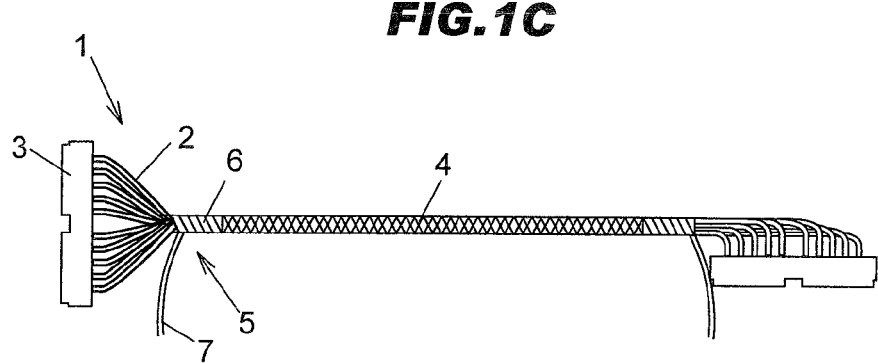

In the cable harness 1 shown in FIG. 1C, a longitudinal side of the connector terminals 3 provided at the left end of the cable harness 1 is arranged vertically to the extended line of the wire group 2, similarly to the connector terminal 3 in the first arrangement shown in FIG. 1A. Respective wires composing the wire group 2 at the left end are separated into a triangular shape (fan shape) from a left end of the part wrapped by the adhesive tape 6 toward the connector terminal 3 at the left end. A longitudinal side of the connector terminal 3 provided at the right end of the cable harness 1 is arranged parallel to the extended line of the wire group 2, similarly to the connector terminal 3 in the first arrangement shown in FIG. 1C. Further, the connector terminal 3 at the right end is arranged below the extended line of the wire group 2 at the right end of the wire group 2. Respective wires composing the wire group 2 at the right end are extended horizontally from the right end of the part wrapped by the adhesive tape 6. The wires are separated at positions corresponding to respective connector pins in each of the connector terminals 3. The wires are bent downward, and extended straightly to the respective poles (connector pins) of the connector terminals 3 at the right end.

(Fourth Arrangement)

Figure 1D:
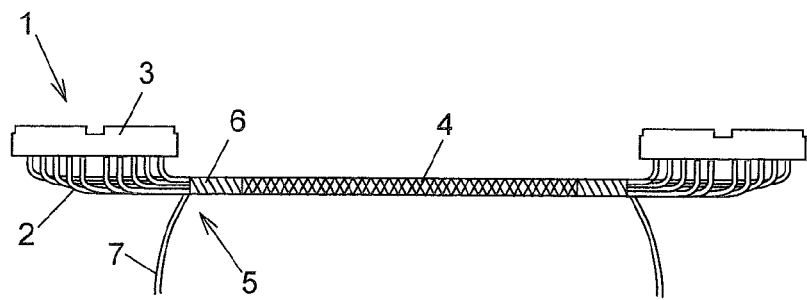

In the cable harness 1 shown in FIG. 1D, the longitudinal sides of the connector terminals 3 provided at the both ends of the cable harness 1 is arranged horizontally, while the wire group 2 is extended horizontally. Both of the connector terminals 3 are arranged above the extended line of the wire group 2. In other words, the longitudinal sides of the respective connector terminals 3 are arranged parallel to the extended line of the wire group 2, and the connecting portions of the connector terminals 3 are arranged toward the same direction. Respective wires composing the wire group 2 are extended horizontally from the distal end of the part wrapped by the adhesive tape 6. The wires are separated at positions corresponding to the respective connector pins in each of the connector terminals 3. The wires are bent toward the connector terminal 3, namely vertically to the extended line of the wire group, and extended straightly to the respective poles (connector pins) of each of the connector terminals 3.

(The Cable Used for the Wire Group 2)

Next, configurations of the single-conductor coaxial cable and the Quad-X cable used for the wire group 2 will be explained below.

Figure 2A:
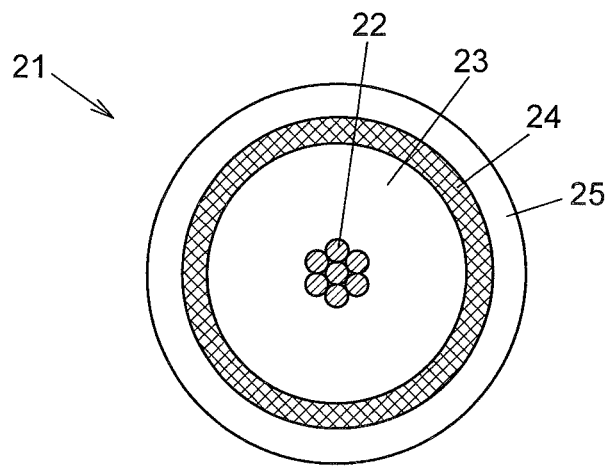
FIG. 2A is a traverse cross sectional view of a single-conductor coaxial cable.

Referring to FIG. 2A, a single-conductor coaxial cable 21 comprises an inner conductor 22 comprising plural metal thin wires stranded with each other, an inner insulator 23 which covers the inner conductor 22, an outer conductor 24 which covers the inner insulator 23, and an outer insulator (jacket) 25 which covers the outer conductor 24.

Figure 2B:
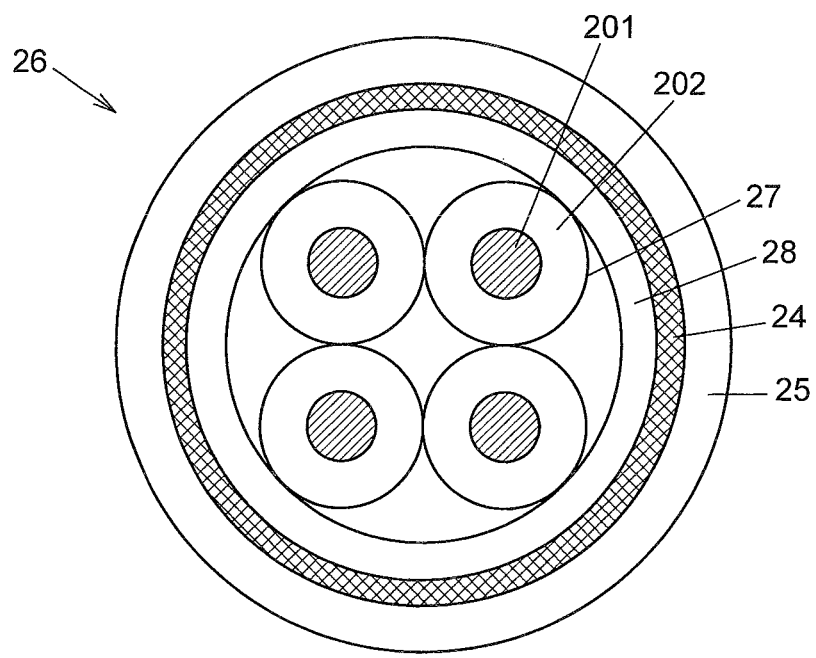
FIG. 2B is a traverse cross sectional view of a four-conductor diagonal coaxial (Quad-X) cable.

Referring to FIG. 2B, a diagonally arranged four-conductor coaxial cable (Quad-X cable) 26 for LVDS (Low Voltage Differential Signaling) comprises four conductor wires 27 that are electrically isolated from each other, each of which comprises a conductor 201 and an insulator 202 which covers the conductor 201, a collective inner insulator 28 which collectively covers the four conductors 27, an outer conductor 24 which covers the collective inner insulator 28, and an outer insulator (jacket) 25 which covers the outer conductor 24.

(The Braid Sleeve 4)

Next, the braid sleeve 4 will be explained below in more detail.

Figure 3A:
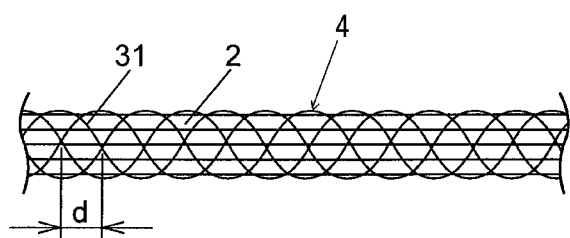
FIGS. 3A and 3B are enlarged side views of braid sleeves in first and second arrangements of the cable harness in the embodiment according to the present invention.

Referring to FIG. 3A, plural copper-plated PET (100% polyester) fibers 31 are used as warp thread and woof thread. The braid sleeve 4 with a tubular shape is made by braiding the copper-plated PET fibers 31 in such a manner than the warp thread and the woof thread are wound around the wire group 2 to cross each other with a predetermined spiral diameter at a predetermined spiral pitch.

It is preferable to use the copper-plated PET fiber 31 with a thickness of 30 to 80 D (denier), considering that a wire part of the cable harness 1 is inserted through a narrow space such as a hinge part of the mobile phone. A thickness of copper-plating is preferably within a range of 80 to 120 μm. When the copper-plating thickness is thinner than a lower limit (i.e. 80 μm) of the above range, the effective of suppressing electromagnetic interference will be low. On the other hand, when the plating thickness is thicker than an upper limit (i.e. 120 μm) of the above range, the copper plating will be grazed at the movable part and easily fall off. Considering that the number of the wires in the wire group 2 passing through the hinge part or the like corresponds to the pole number (pin number) normally used for the mobile phone, an inner diameter of the braid sleeve 4 is preferably 1.0 to 3.0 mm.

The copper-plated PET fiber 31 is a metal-plated high tension fiber, which is excellent in softness, flexibility, and abrasion-resistance. Therefore, the copper-plated PET fiber 31 is not easily damaged after being repeatedly bent and twisted for 300,000 cycles or more at the hinge part of the mobile phone. Further, the copper-plated PET fiber 31 does not give damages such as abrasion from outside or buckling to the wire group 2. In addition, because the copper-plated PET fiber 31 is made by plating copper onto a surface of the PET fiber comprising a multi-strand fiber, a surface of the copper plating and a surface of the wire jacket (outer insulator) 25 may contact directly to each other.

The multi-strand fiber comprises plural fibers (plural high tension fibers) that are stranded together. When comparing the multi-strand fiber and a single-fiber high tension fiber that have the same outer diameter, the multi-strand fiber has less elasticity. Therefore, when being bent, the single-fiber high tension fiber maintains roundness in its cross-section, while the multi-strand fiber becomes flat in its cross section because each wire is moved aside by bending. Therefore, the contact of the braid sleeve 4 to the electric wire in the wire group 2 becomes softer (i.e. a contact surface is increased) by using the multi-strand fiber compared with the single-fiber high tension fiber, thereby reducing the damage to the electric wire.

A mesh interval d of the braid sleeve 4 is preferably 0.1 to 1.0 mm, considering easiness for maintaining an original shape without disarranging the mesh, hardness of an entire part of the braid sleeve 4, and a balance for preventing the wires of the wire group 2 from breaking out of the mesh.

Additionally, the role of the braid sleeve 4 is to bundle the wire group 2 of the entire cable harness 1, and to make the cable harness 1 operate flexibly according to the movement of the equipment, e.g. the movement of a lower casing for a main body and an upper casing for a liquid crystal display of the mobile phone (not shown). Therefore, so the number of fibers in one carrier for the mesh is preferably 4 to 10. When the number of fibers in one carrier is too large, the outer diameter of the braid sleeve 4 is increased, thereby lacking in flexibility.

Figure 3B:
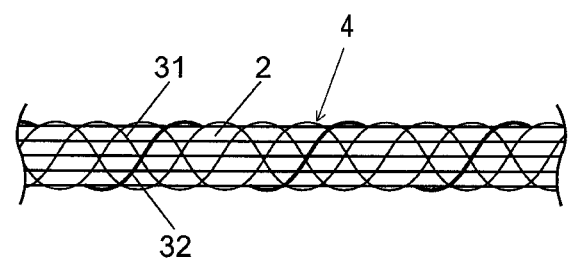

Referring to FIG. 3B, the braid sleeve 4 may be made by combining the copper-plated PET fiber 31 and a high tension PET (polyethylene terephthalate) fiber 32 comprising a high tension fiber without plating (namely, non-metallized high tension fiber) and having a tensile strength of 700 MPa or more. The outer diameter of the high tension PET fiber 32 is preferably 0.04 to 0.10 mm, considering that the wire part of the cable harness 1 is inserted through a narrow space such as the hinge part of the mobile phone. Further, the number of fibers in one carrier for the mesh of the braid sleeve 4 is preferably 4 to 10, since sufficient flexibility can be achieved by using the high tension PET fiber with the tensile strength of 700 MPa or more.

The braid sleeve 4 comprising a combination of the copper-plated PET fiber 31 and the high tension PET fiber 32 may be braided by winding a first thread (e.g. warp thread) comprising a plurality (4 to 10 wires in one carrier) of copper-plated PET fibers 31 and a second thread (e.g. woof thread) of one or more high tension PET fibers 32, such that the first thread and the second thread cross each other. By providing the braid sleeve 4 with the above configuration, when the cable harness 1 is bent, twisted, or slid in U-shape at the movable part, it is possible to reduce a contact between the copper-plates of adjacent copper-plated PET fibers 31 due to the bending, particularly in a crossing part where the first thread and the second thread overlap. Accordingly, it is possible to suppress the copper-plating of the copper-plated PET fiber 31 from abrasion and exfoliation.

Additionally, the braid sleeve 4 may be braided by winding a first thread (e.g. warp thread) comprising the copper-plated PET fiber 31 and the high tension PET fiber 32, and a second thread (e.g. woof thread) comprising the high tension PET fiber 32. It is more preferable that the first thread is formed by alternately disposing the copper-plated PET fiber 31 and the high tension PET fiber 32 in parallel. By providing the braid sleeve 4 with the above configuration, when the cable harness 1 is bent, twisted, or slid in U-shape at the movable part, it is possible to reduce a contact between the copper-plates of adjacent copper-plated PET fibers 31 due to the bending, in a crossing part where the first thread and the second thread overlap, and in the first thread.

In the case of using the braid sleeve 4 comprising a combination of the copper-plated PET fiber 31 and the high tension PET fiber 32, it is enough that at least the copper-plated PET fiber 31 is electrically connected to a ground part of the equipment. If there is no problem in electrical connection, a connecting process may be simplified by connecting the copper-plated PET fiber 31 and the high tension PET fiber 32 together to the ground part of the equipment. Further, in the case of using the braid sleeve 4 comprising the combination of the copper-plated PET fiber 31 and the high tension PET fiber 32, a ratio of the copper-plated PET fiber 31 per unit surface area is preferably 60% or more in order to suppress the increase of the electrostatic noise Additionally, it is preferable that the copper-plated PET fiber 31 is a multi-strand fiber for the above reason, and the high tension PET fiber 32 is a single fiber for the reason below. Namely, the braid sleeve 4 will be more flexible by providing the high tension PET fiber 32 as the single fiber, compared with the case of using plural fibers of the high tension PET fiber 32. Therefore, it is possible more elasticity for helping sliding movement at the sliding part, and more elasticity for helping bending movement at the bending part, which improves motion performance at the movable part of the equipment. Herein, the "elasticity" means a restoring force to return to the original form. Further, a ratio of the copper-plated PET fiber 31 and the high tension PET fiber 32 may be changed appropriately according to shield performance and motion performance required for the braid sleeve 4.

(Advantages of the First Embodiment)

Next, advantages of the first embodiment according to the present invention will be explained below.

In the first embodiment, the cable harness 1 comprises the wire group 2, the braid sleeve 4 provided at an outer periphery of the wire group 2, and the braid sleeve 4 comprises the copper-plated PET fiber 31. The cable harness further comprises the ground connecting parts 5 at both ends of the braid sleeve 4. The ground connecting part is electrically connected to the ground part in the equipment, and electrically connected in parallel to both ends of the single-conductor coaxial cable 21 in the wire group 2 or both ends of the outer conductor 25 of the Quad-X cable 26. According to this structure, the cable harness 1 is excellent in electrostatic noise resistance, mechanical characteristics, and easiness in wiring operation, in the case of using the cable harness 1 for signal transmission between a main body and a movable part in compact electronic devices such as laptop computers, mobile phones, compact video cameras, and PDA, in which the movable part of a casing for mounting a liquid crystal display is configured to be openable and closable, twistable, and slidable with respect to the main body.

The copper-plated PET fiber 31 used for the first embodiment is different in flexibility from the tinsel-copper disclosed by JP-A 2006-24372. Since the copper-plated PET fiber 31 is so soft that it can be torn by hands, the copper-plated PET fiber 31 does not damage the wire jacket 25 of the wire group 2. Therefore, it is possible to insert the wire group 2 into the braid sleeve 4 without protecting and bundling the wire group 2 by the PTFE tape, thereby reducing the production cost.

Further, the cable harness 1 is more flexible than the conventional device, thereby enhancing flex resistance.

Still further, since the copper-plated PET fiber 31 is used for the braid sleeve 4 in the cable harness 1, even though the copper-plated PET fiber 31 is degraded from repeated rotation, twisting, or sliding movements, only fine metal dust will be produced. Therefore, even if the fine metal dust drops on a substrate, the fine metal dust will not cause a failure such as short-circuit.

Next, the second to fourth embodiment according to the present invention will be explained below.

Second Embodiment

Figure 4:
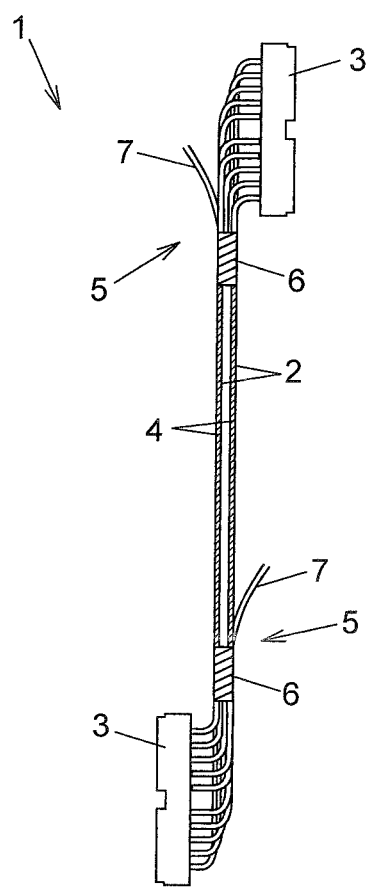
FIG. 4 is a side view of a cable harness in a second embodiment according to the present invention.

Referring to FIG. 4, a cable harness 1 in the second embodiment is similar to the second arrangement of the first embodiment shown in FIG. 1B, except that wire group 2 is divided into two groups. Same reference numerals are assigned to parts of the second embodiment similar to those in the first embodiment.

Herein, two connector terminals 3 are arranged vertically, and a connecting portion of one connector terminal 3 at un upper side is arranged toward the right side, while a connecting portion of the other connector terminal 3 at a lower side is arranged toward the left side. Between the both connector terminals 3, the wire group 2 divided into the two groups are disposed vertically. Each of the two wire groups 2 comprises plural wires (including the single-conductor coaxial cable 21, or the Quad-X cable 26). Each wire group 2 is provided with a braid sleeve 4. The wire groups 2 and the braid sleeves 4 are integrated by wrapping ends of the braid sleeves 4 by a common adhesive tape 6. Respective wires composing the wire group 2 are separated at positions corresponding to respective poles (connector pins) in each of the connector terminals 3. The wires are bent toward the connector terminal 3 and extended straightly to the respective poles (connector pins) of each of the connector terminals 3. In accordance with the wire groups 2, the braid sleeve 4 may be divided into two or more branches, and the respective wire groups 2 may be accommodated into corresponding branches of the braid sleeve 4. In the second embodiment, the lengths of the wire group 2 are equal to each other.

Third Embodiment

Figure 5:
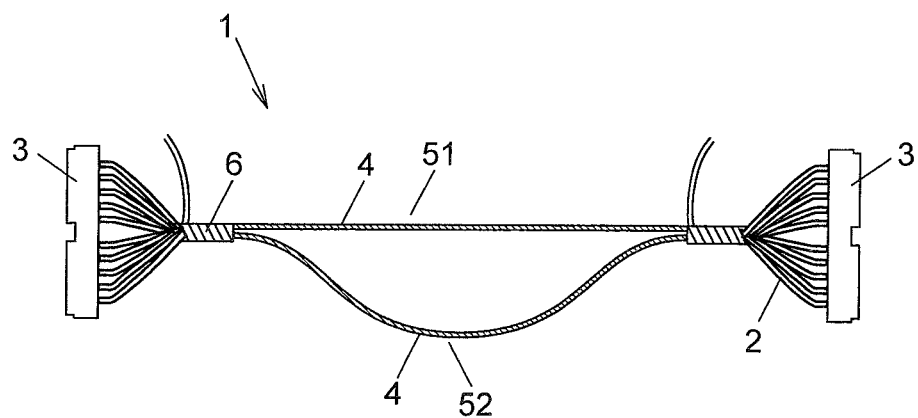
FIG. 5 is a side view of a cable harness in a third embodiment according to the present invention.

Referring to FIG. 5, a cable harness 1 in the second embodiment is similar to the first arrangement of the first embodiment shown in FIG. 1A, except that wire group 2 is divided into two groups, in which a length of one group is longer than that of the other group. Same reference numerals are assigned to parts of the third embodiment similar to those in the first embodiment.

Herein, longitudinal sides of connector terminals 3 are arranged vertically to an extended line of a wire group 2, and a connecting portion of the connector terminal 3 on the right side is disposed toward the right side while a connecting portion of the other connector terminal 3 on the left side is disposed toward the left side. The both connector terminals 3 are connected by the wire group 2 divided into two groups. Each wire group 2 is provided with a braid sleeve 4. The wire groups 2 and the braid sleeves 4 are integrated by wrapping ends of the braid sleeves 4 by a common adhesive tape 6. Respective wires composing each wire group 2 are separated one by one into a triangular shape (fan shape) from a distal end of the part wrapped by the common adhesive tape 6 toward the connector terminal 3.

One wire group 2 covered by the braid sleeve 4 is a direct harness 51 with a predetermined length, and the other wire group 2 covered by the other braid sleeve 4 is a bypass harness 52 with a length longer than that of the direct harness 51. Namely, the bypass harness 52 has a surplus length with respect to the direct harness 51. In accordance with the direct harness 51 and the bypass harness 52, the braid sleeve 4 may be divided into two or more branches. In the meantime, the lengths of the respective braid sleeves 4 may be different from each other, and the lengths of the respective wire groups 2 may be different from each other.

Fourth Embodiment

Figure 6:
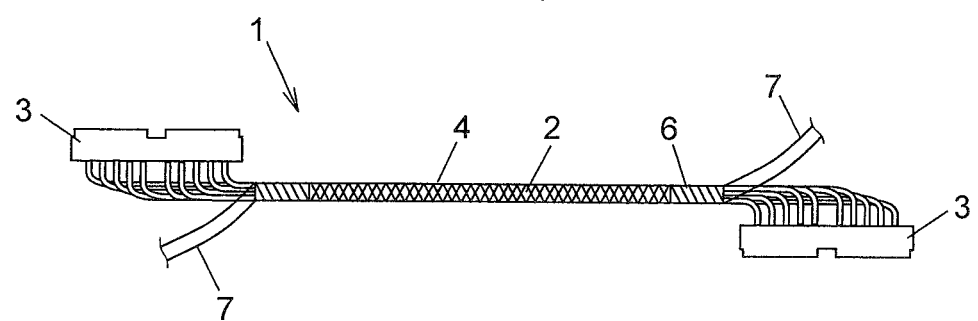
FIG. 6 is a side view of a cable harness in a fourth embodiment according to the present invention.

Referring to FIG. 6, a cable harness 1 in the fourth embodiment is similar to the second arrangement of the first embodiment shown in FIG. 1B, except extensions 7 of the copper-plated PET fiber are arranged toward opposite directions. Same reference numerals are assigned to parts of the second embodiment similar to those in the first embodiment.

The longitudinal side of each of the connector terminals 3 provided at the both ends of the cable harness 1 is arranged horizontally, while the wire group 2 is extended horizontally. One of the connector terminals 3 is arranged above the extended line of the wire group 2 at the left end of the wire group 2, and an extension 7 of the copper-plated PET fiber on the left side is provided to extend toward the left lower direction. The other of the connector terminals 3 is arranged below the extended line of the wire group 2 at the right end of the wire group 2, and another extension 7 of the copper-plated PET fiber on the right side is provided to extend toward the right upper direction.

Examples

Samples of cable harness 1 in Examples 1, 2 and samples of a cable harness in comparative examples 1, 2 were prepared for evaluating mechanical characteristics thereof.

Firstly, configurations of cable harnesses and braid sleeves will be explained below.

(1) Cable Harness Using a Single-Conductor Coaxial Cable 21 (Referring to FIG. 2A)

An inner conductor 22 was a multi-strand wire comprising seven threads of Sn-plated Cu alloy wire having a wire diameter of 0.064 mm. An inner insulator 23 comprising PFA (perfluoro alkoxy copolymer) with a thickness of 0.06 mm was formed around the inner conductor 22. An outer conductor 24 was formed by braiding Sn-plated Cu alloy wires with a wire diameter of 0.04 mm around the inner insulator 23. A jacket 25 made of PFA with a thickness of 0.04 mm was formed around the outer conductor 24. An outer diameter of the single-conductor coaxial cable 21 was 0.344 mm.

Forty pieces of the single-conductor coaxial cable 21 were bundled and inserted into a braid sleeve 4 as explained below to provide a cable harness 1 as a sample of Example 1.

Similarly, forty pieces of the single-conductor coaxial cable 21 were bundled and wrapped by a PTFE tape with a thickness of 55 µm at ½ wrapping (i.e. half-overlapped) to provide a cable harness as a sample of the comparative example 1.

(2) Cable Harness Using Quad-X Cable 26 (Referring to FIG. 2)

A conductor 201 was a multi-strand wire comprising seven threads of Sn-plated Cu alloy wire having a wire diameter of 0.064 mm. An insulator 202 comprising PFA with a thickness of 0.06 mm was formed around the conductor 201 to provide a core conductor 27. Four core conductors 27 were bundled and stranded together, then bound by wrapping by a collective inner insulator 28 made of a polyester tape 4. Thereafter, the bound core conductors 27 is wrapped by Sn-plated Cu alloy wire with a wire diameter of 0.064 mm to provide an outer conductor 24 as a shield layer. A complex tape in which a fluororesin or copper-plated (evaporation coating) polyester tape and a polyester tape are stuck to each other) was wound around the outer conductor 24 as a sheath (jacket) 25, to provide four-conductor diagonal coaxial cable (Quad-X cable) 26. An outer diameter of the four-conductor diagonal coaxial cable 26 was 0.57 mm.

Ten pieces of the Quad-X cable 26 were bundled and inserted into a braid sleeve 4 as explained below to provide a cable harness 1 as a sample of Example 2.

Similarly, ten pieces of the Quad-X cable 26 were bundled and wrapped by a PTFE tape with a thickness of 55 µm at ½ wrapping (i.e. half-overlapped) to provide a cable harness as a sample of the comparative example 2.

(3) Braid Sleeve (Referring to FIG. 3)

PET fiber of 30 D (denier), on which a copper-plating with a thickness of 100 μm is provided, was used as a copper-plated PET fiber (metal-plated high tension fiber) 31. A braid sleeve 4 was formed to have an inner diameter of 2.0 mm, a mesh interval d of 0.2 mm, and a number of fibers in one carrier to be 4. The braid sleeve 4 was cut in a desired length and was fixed by a tape at both ends so that the copper-plated PET fiber 31 would not ravel.

Herein, the braid sleeve 4 may comprise a mixed woven braid formed by braiding the metallized high tension fiber and the non-metallized high tension fiber alternately, by which the effect of the present invention can be obtained.

Next, the mechanical characteristics evaluation tests for the cable harnesses 1 in the Examples 1, 2 and the cable harnesses in the comparative examples 1, 2 will be explained below.

(Flex Test)

Figure 7:
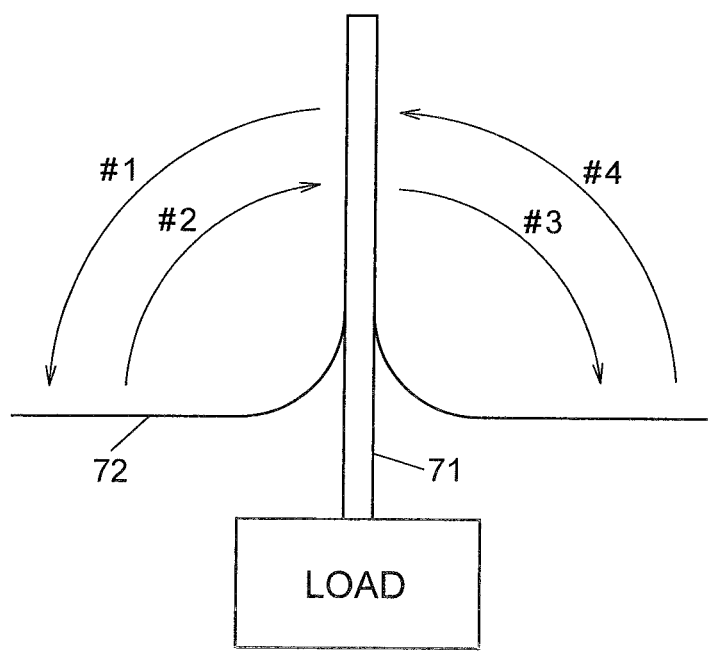
FIG. 7 is an explanatory diagram showing a flex test method.

In the flex text, as shown in FIG. 7, a sample cable 71 is bent and pinched by a bending jig 72, and a load of 200 g is attached to a lower end of the sample cable 71 which is drooping down from the bending jig 72. The bending jig 72 is rotated by 90 degrees counter clockwise as indicated by an arrow #1, then returned to the original position by rotating 90 degrees clockwise as indicated by an arrow #2. Further, the bending jig 72 is rotated by 90 degrees clockwise as indicated by an arrow #3, then returned to the original position by rotating 90 degrees counter clockwise as indicated by an arrow #4. In this manner, the sample cable 71 is bent in right and left directions by 90 degrees repeatedly under a predetermined tensile load.

As the sample cable 71, samples in Examples 1, 2, and samples in the comparative examples 1, 2 were used.

The test speed is 30 cycles/minute. The flexion angle is ±90 degrees. The test cycle is #1→#2→3#3→#4. The load is 2N (200 gf). The bending radius is 6 mm.

As to wire breaking detection method, voltage of several volts (V) is constantly applied to the sample cable 71 until electric current value drops by 20% from an initial value of the test. The time when the electric current value drops by 20% is consider as "lifetime" (maximum cycles in that a wire breaking happens).

(Twisting Test)

Figure 8:
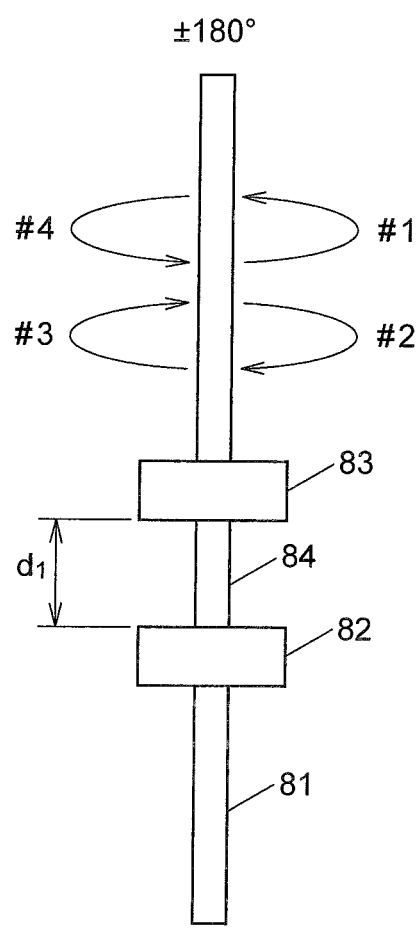
FIG. 8 is an explanatory diagram showing a twist test method.

In the twisting test, as shown in FIG. 8, a sample cable 81 is held by a fixing chuck part 82 and a twisting chuck part 83. A part provided between the fixing chuck part 82 and the twisting chuck part 83 is a twisting part 84. The twisting chuck part 83 is rotated by 180 degrees counter clockwise as indicated by an arrow #1, and returned to the original position by rotating 180 degrees clockwise as indicated by an arrow #2. Then, the twisting chuck part 83 is rotated by 180 degrees clockwise as indicated by an arrow #3, and returned to the original position by rotating 180 degrees counter clockwise as indicated by an arrow #4. In this manner, the sample cable 81 is twisted in right and left directions by 180 degrees repeatedly at the twisting part 84.

As the sample cable 81, the same cables as the sample cable 71 for the flex test were used.

The test speed is 30 cycles/minute. The twisting angle is ±180 degrees. The test cycle is #1→#2→#3→#4. The load is 0.05N (50 gf). A length d1 of the twisting part is 10 mm.

As to wire breaking detection method, voltage of several volts (V) is constantly applied to the sample cable 81 until electric current value drops by 20% from an initial value of the test. The time when the electric current value drops by 20% is consider as "lifetime" (maximum cycles in that a wire breaking happens).

(Sliding Test)

Figure 9:
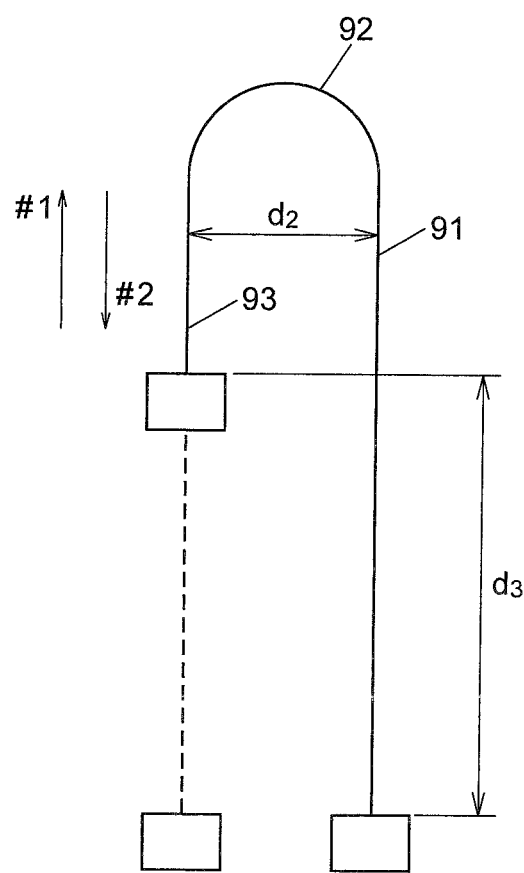
FIG. 9 is an explanatory diagram showing a slide test method.
Figure 10:
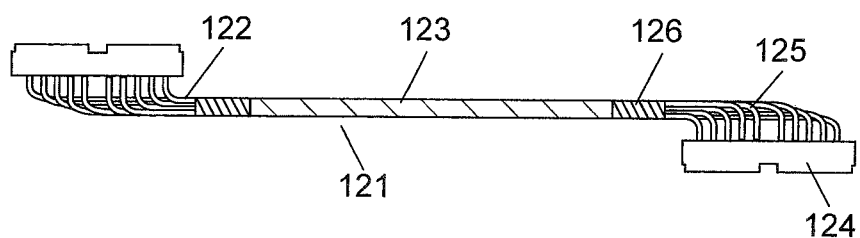
FIG. 10 is a side view of a conventional cable harness.

In the sliding test for evaluating the durability in the U-shape sliding, as shown in FIG. 9, a U-shaped turnback part 92 is formed in a sample cable 91. A tip end part 93 of the sample cable 91 is moved straight toward the turnback part 92 as indicated by an arrow #1, and returned to the original position by moving straight toward an opposite direction with respect to the turnback part 92 as indicated by an arrow #2. In this manner, U-shape turnback motion is repeatedly applied to the sample cable 91 over a predetermined length range.

As the sample cable 91, the same cables as the sample cable 71 for the flex test were used.

The test speed is 30 cycles/minute. Sliding inner width d2 is 80 mm. The test cycle is #1→#2. Stroke length d3 is 60 mm.

As to wire breaking detection method, voltage of several volts (V) is constantly applied to the sample cable 91 until electric current value drops by 20% from an initial value of the test. The time when the electric current value drops by 20% is consider as "lifetime" (maximum cycles in that a wire breaking happens).

TABLE 1 shows evaluation result of the mechanical characteristic. Regarding the flexion lifetime, twisting lifetime, and sliding lifetime, "200,000 cycles and more" was evaluated as "acceptable" and "less than 200,000 cycles" was evaluated "unacceptable".

TABLE 1

|  | Example 1 | Example 2 | Comparative example 1 | Comparative example 2 |
| --- | --- | --- | --- | --- |
| Type of cable | 1-conductor coaxial cable | 4-conductor diagonal coaxial cable (Quad-X) | 1-conductor coaxial cable | 4-conductor diagonal coaxial cable (Quad-X) |
| Braid Sleeve/ Tape wrapping | Braid sleeve | Braid sleeve | Tape wrapping | Tape wrapping |
| Flexion Lifetime (Cycles) | 300,000 or more | 220,000 or more | 210,000 | 150,000 |
| Twisting Lifetime (Cycles) | 300,000 or more | 300,000 or more | 200,000 | 190,000 |
| Sliding Lifetime (Cycles) | 200,000 or more | 200,000 or more | 40,000 | 45,000 |

1) As to the flexing characteristics, while the wires of the samples in the comparative examples 1 and 2 were broken at 210,000 or 150,000 cycles, respectively, the wires of the samples in Examples 1 and 2 were not broken at 300,000 cycles or more or 220,000 cycles or more, respectively. Also, the braid sleeve 4 did not show any crack.

2) As to the twisting characteristics, while the wires of the samples in the comparative examples 1 and 2 were broken at 200,000 or 190,000 cycles, respectively, the wires of the samples in Examples 1 and 2 were not broken at 300,000 cycles or more. Also, the braid sleeve 4 did not show any crack.

3) As to the sliding characteristics, while the wires of the samples in the comparative examples 1 and 2 were broken at 40,000 or 45,000 cycles, the wires of the samples in Examples 1 and 2 were not broken at 200,000 cycles or more. Also, the braid sleeve 4 did not show any crack.

(Mix Woven Braid Sleeve)

The mechanical characteristics of the mix woven braid sleeve made by braiding alternately the first thread comprising the copper-plated PET fiber and the second thread comprising the high tension PET fiber were evaluated. Firstly, a mix woven braid sleeve was formed by braiding alternately the first thread comprising the copper-plated PET fiber used in Example 1 and the second thread comprising high tension PET fiber. Then, the single-conductor coaxial cable used in Example 1 is inserted into the mix woven braid sleeve, to provide a cable harness. Samples of cable harnesses in Examples 3 to 5 and cable harness in comparative example 3 were prepared, and mechanical characteristics thereof were evaluated in a manner similar to those in Examples 1 and 2.

TABLE 2 shows the evaluation results of the mechanical characteristics of the cable harnesses in Examples 3 to 5 and comparative example 3.

Regarding the flexion lifetime, twisting lifetime, and sliding lifetime, "200,000 cycles and more" was evaluated as "acceptable" and "less than 200,000 cycles" was evaluated "unacceptable", similarly to Examples 1 and 2.

cycles. As conclusion, the tensile strength of the high tension PET fiber is preferably 700 MPa or more.

Additionally, the EMI characteristics of Examples 3 and 4 are better than that of Example 5, since the copper-plated PET rate is 83.3% for the samples in Examples 3 and 4.

It is understood from the evaluation result that the cable harness 1 of the present invention is superior to the conventional device in mechanical characteristics. In addition, the cable harness 1 of the present invention is provided with the braid sleeve 4 formed by braiding the copper-plated PET fiber 31, so that the cable harness 1 has excellent electrostatic noise resistance. Further, the cable harness 1 does not exhibit no failure due to exfoliation of the copper foil, as the harness disclosed by JP-A 2006-24372.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A cable harness comprising:
   a wire group comprising plural electric wires;
   connector terminals provided at both ends of the wire group;
   a braid sleeve provided around an outer periphery of the wire group, the braid sleeve comprising a metal-plated high tension fiber, the metal-plated high tension fiber comprising a multi-strand polyethylene terephthalate (PET) fiber plated by aluminum, copper, aluminum alloy or copper alloy; and
   ground connecting parts provided at both ends of the braid sleeve that are configured to be electrically connected to a ground part in an equipment, wherein the braid sleeve further comprises a high tension PET fiber, and
   wherein the metal-plated high tension fiber comprises a first thread and the high tension PET fiber comprises a

TABLE 2

| | Example 3 | Example 4 | Example 5 | Comparative Example 3 |
|---|---|---|---|---|
| High Tension PET Fiber Tensile strength (MPa) | 700 | 800 | 900 | 650 |
| Number of fibers in one carrier for High Tension PET Fiber (Number) | 1 | 1 | 4 | 1 |
| Rate of copper-plated PET in total fibers (%) | 83.3 | 83.3 | 33.3 | 83.3 |
| Mechanical Characteristics Flexion Lifetime (cycles) | 200,000 or more | 200,000 or more | 200,000 or more | 160,000 |
| Twisting Lifetime (cycles) | 200,000 or more | 200,000 or more | 200,000 or more | 170,000 |
| Sliding Lifetime (cycles) | 200,000 or more | 200,000 or more | 200,000 or more | 170,000 |

As shown in TABLE 4, it is confirmed that the samples in Examples 3 to 5, which use the high tension PET fiber with tensile strength of 700 MPa or more, have the flexion lifetime of 200,000 cycles or more, the twisting lifetime of 200,000 cycles or more, and the sliding lifetime of 200,000 cycles or more. On the contrary, the sample in the comparative example 3, which uses the high tension PET fiber with tensile strength of less than 700 MPa, has the flexion lifetime, the twisting lifetime, and the sliding life that are far less than 200,000 second thread and wherein the first thread and the second thread are alternately braided in the braid sleeve.

2. The cable harness according to claim 1, wherein the high tension polyethylene terephthalate fiber has a tensile strength not less than 700 megapascal.

3. The cable harness according to claim 1, wherein the braid sleeve is braided such that the first thread and the second thread cross each other, and the first thread further comprises a combination of the metal-plated high tension fiber and the high tension polyethylene terephthalate fiber.

4. The cable harness according to claim 3, wherein the metal-plated high tension fiber and the high tension polyethylene terephthalate fiber are alternately disposed in parallel in the first thread.

5. The cable harness according to claim 1, wherein the high tension polyethylene terephthalate fiber comprises a single fiber.

6. The cable harness according to claim 1, wherein the ground connecting parts are configured to be electrically connected to a ground part of an equipment comprising any of an opening and closing part, a twisting part, or a U-shape sliding part.

7. The cable harness according to claim 1, wherein the wire group is divided into two or more groups and provided with the braid sleeve, respectively.

8. The cable harness according to claim 7, wherein the braid sleeve is divided into two or more groups.

9. The cable harness according to claim 1, wherein the metal-plated high tension fiber comprises a copper-plated polyethylene terephthalate fiber.

10. The cable harness according to claim 1, wherein the high tension polyethylene terephthalate fiber comprises a non-plated polyethylene terephthalate fiber.

11. The cable harness according to claim 1, wherein each of the ground connecting parts comprises an extension of the metal-plated high tension fiber.

* * * * *